US009871965B2

(12) United States Patent
Dabral et al.

(10) Patent No.: US 9,871,965 B2
(45) Date of Patent: Jan. 16, 2018

(54) IMAGE PROCESSING FOR WIDE DYNAMIC RANGE (WDR) SENSOR DATA

(71) Applicant: Texas Instruments Incorporated, Dallas, TX (US)

(72) Inventors: Shashank Dabral, Allen, TX (US); Mihir Narendra Mody, Karnataka (IN); Gang Hua, Katy, TX (US); Anthony Lell, San Antonio, TX (US); Niraj Nandan, Plano, TX (US); Rajashekhar Allu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 29 days.

(21) Appl. No.: 15/183,495

(22) Filed: Jun. 15, 2016

(65) Prior Publication Data
US 2017/0223267 A1 Aug. 3, 2017

Related U.S. Application Data

(60) Provisional application No. 62/290,786, filed on Feb. 3, 2016.

(51) Int. Cl.
*H04N 5/232* (2006.01)
*H04N 5/235* (2006.01)
(Continued)

(52) U.S. Cl.
CPC ......... *H04N 5/23232* (2013.01); *G06T 5/008* (2013.01); *H04N 5/2353* (2013.01);
(Continued)

(58) Field of Classification Search
CPC .. H04N 5/2355; H04N 5/235; H04N 5/35554; H04N 5/35581; H04N 5/35563;
(Continued)

(56) References Cited

U.S. PATENT DOCUMENTS 7,750,950 B2 * 7/2010 Tamaru ................. H04N 5/202
348/227.1
7,995,115 B2 * 8/2011 Kurane ................. H04N 5/235
348/222.1
(Continued)

FOREIGN PATENT DOCUMENTS

JP 2003259234 9/2003

*Primary Examiner* — Michael Osinski
(74) *Attorney, Agent, or Firm* — Ronald O. Neerings; Charles A. Brill; Frank D. Cimino

(57) ABSTRACT

A signal processing chain implements wide dynamic range (WDR) multi-frame processing including receiving raw image signals from a WDR sensor including a plurality of frames including a first frame including first exposure time pixel data and a second frame including second exposure time pixel data. Statistics for camera control are generated including first statistics for the first pixel data and second statistics for the second pixel data. The first and second pixel data are merged using WDR merge algorithm in a WDR merge block which utilizes the first and second statistics to generate a raw higher bit width single frame image. The single frame image is post-processed in post-processing block using at least a defect pixel correction algorithm, and at least a portion of tone mapping is performed on the single frame image after the post-processing to provide an output toned mapped image.

16 Claims, 3 Drawing Sheets

(51) Int. Cl.
*H04N 5/355* (2011.01)
*H04N 5/367* (2011.01)
*H04N 9/04* (2006.01)
*H04N 5/265* (2006.01)
*G06T 5/00* (2006.01)

(52) U.S. Cl.
CPC ......... *H04N 5/2355* (2013.01); *H04N 5/2356* (2013.01); *H04N 5/265* (2013.01); *H04N 5/35572* (2013.01); *H04N 5/3675* (2013.01); *H04N 9/045* (2013.01); *G06T 2207/20208* (2013.01); *H04N 2201/0084* (2013.01)

(58) Field of Classification Search
CPC .. H04N 5/23245; H04N 5/2353; H04N 5/335; H04N 5/35536; H04N 5/23229; H04N 5/23232; H04N 5/353; H04N 5/3572; H04N 9/045; H04N 9/643; H04N 9/63; H04N 9/76; H04N 9/8042; H04N 9/735; G06T 5/007–5/009; G06T 5/50; G06T 5/002; G06T 5/20; G06T 2207/20208; G06T 2207/10016; G06T 2207/10024; G06T 2207/20221; G06T 1/20
See application file for complete search history.

(56) References Cited

U.S. PATENT DOCUMENTS

| | | | |
|---|---|---|---|
| 8,903,222 B2 * | 12/2014 | Miyakoshi | H04N 5/145 386/239 |
| 8,947,555 B2 * | 2/2015 | Velarde | H04N 5/2355 348/223.1 |
| 8,964,055 B2 * | 2/2015 | Suzuki | H04N 5/23264 348/221.1 |
| 8,988,548 B2 * | 3/2015 | Manabe | H04N 5/2355 348/222.1 |
| 9,479,695 B2 * | 10/2016 | Lim | H04N 5/23229 |
| 9,538,092 B2 * | 1/2017 | Mody | H04N 5/345 |
| 9,704,269 B2 * | 7/2017 | Dabral | G06T 9/00 |
| 2006/0181624 A1 | 8/2006 | Krymski | |
| 2007/0223059 A1 * | 9/2007 | Oishi | H04N 1/0402 358/482 |
| 2008/0252750 A1 * | 10/2008 | Ogawa | H04N 5/23232 348/229.1 |
| 2008/0267530 A1 * | 10/2008 | Lim | H04N 5/235 382/284 |
| 2008/0284693 A1 | 11/2008 | Sarma et al. | |
| 2009/0059051 A1 | 3/2009 | Sakamoto | |
| 2009/0091645 A1 * | 4/2009 | Trimeche | H04N 5/235 348/273 |
| 2012/0008005 A1 * | 1/2012 | Fukunishi | H04N 5/145 348/222.1 |
| 2014/0152694 A1 * | 6/2014 | Narasimha | G09G 5/377 345/629 |
| 2014/0160260 A1 | 6/2014 | Blanquart et al. | |
| 2015/0116525 A1 * | 4/2015 | Peng | G06T 5/50 348/218.1 |
| 2015/0170389 A1 * | 6/2015 | Ming | G06K 9/00684 382/284 |
| 2015/0207973 A1 * | 7/2015 | Iwasaki | H04N 5/2352 348/229.1 |
| 2015/0249795 A1 * | 9/2015 | Cho | H04N 5/3572 348/229.1 |
| 2016/0105656 A1 * | 4/2016 | Lin | H04N 9/735 348/223.1 |
| 2016/0119575 A1 | 4/2016 | Dabral | |
| 2016/0148356 A1 * | 5/2016 | Dabral | G06T 1/20 382/166 |
| 2016/0255320 A1 * | 9/2016 | Shintani | H04N 1/6027 348/239 |
| 2016/0292837 A1 * | 10/2016 | Lakemond | G06T 5/002 |
| 2016/0344956 A1 * | 11/2016 | Takado | H04N 5/3597 |
| 2017/0061646 A1 * | 3/2017 | Shimada | G06T 5/50 |
| 2017/0238029 A1 * | 8/2017 | Kiser | H04N 21/23439 |

* cited by examiner

IMAGE PROCESSING FOR WIDE DYNAMIC RANGE (WDR) SENSOR DATA

CROSS REFERENCE TO RELATED APPLICATIONS

This application claims the benefit of Provisional Application Ser. No. 62/290,786 entitled "Efficient and flexible method for raw image processing of wide dynamic range sensors", filed Feb. 3, 2016, which is herein incorporated by reference in its entirety.

FIELD

Disclosed embodiments relate to wide dynamic range (WDR) image processing.

BACKGROUND

Cameras and image sensors are in widespread use for surveillance, motion control and other applications. WDR sensors are becoming popular for automotive and surveillance applications to preserve the full dynamic range of a natural scene. Automotive applications, for example, include rear view cameras for assisting a driver while backing up, and cameras providing inputs to control systems for avoiding obstacles and controlling braking, steering, and acceleration.

Some next generation photodetectors provide a WDR output and are thus considered WDR image sensors. When a photographed image, such as from WDR image sensors, includes some of its pixels with bright regions and some other pixels with dark regions due to significant differences in the illumination intensity of the scene, an image of the scene clearly showing features in both the bright regions and dark regions cannot be obtained even when the exposure time and the aperture are properly adjusted. High dynamic range (HDR) imaging is an imaging technique that combines pixels from multiple frames (or exposures) having different exposure times, apertures, shutter speed and/or sensitivity) of the same picture (scene) with some pixels from each frame being used to encompass the brightness range of the entire frame set, generally so that the obtained picture covers the same dynamic range a human's eyes would. WDR imaging is a term used in the surveillance camera industry to refer to HDR imaging, where as used herein WDR imaging also refers to HDR imaging.

In conventional WDR imaging, image processing of raw pixel data (image pre-processing) is the first processing step, followed by a WDR merge (or fusion) algorithm, and then tone mapping. The input raw pixel data from the WDR sensor can be in the form of Bayer, RCCC, RGBC, or more generally in any 2×2 color format. The image pre-processing includes applying multiple algorithms including defective pixel correction (DPC), lens shading correction (LSC), noise filtering (NF), WDR processing, white balance (WB) and statistics collection. Statistics collection comprises statistics for all frames used, such as statistics for a long exposure time frame, a short exposure time frame, and a shortest exposure time frame. The raw pixel data can come directly from a WDR sensor (e.g., color camera) or from a memory (e.g. a double data rate synchronous dynamic random-access memory (SDRAM DDR)).

WDR fusion of the pixel data follows the image pre-processing. Tone mapping that follows WDR fusion is for reducing the dynamic range (i.e., less bits), or contrast ratio, of the full color image while retaining localized contrast to provide a tone mapped image. A demosaicing (or de-mosaicing) algorithm which is a digital image process that reconstructs a full color image generally follows the tone mapping.

SUMMARY

This Summary briefly indicates the nature and substance of this Disclosure. It is submitted with the understanding that it will not be used to interpret or limit the scope or meaning of the claims.

Disclose embodiments recognize in conventional wide dramatic range (WDR) imaging processing (e.g., defective pixel correction (DPC), lens shading correction (LSC), noise filtering (NF), WDR processing, and statistics collection) comprise raw pre-processing as it takes place before the WDR merge algorithm resulting in a pre-processing load that is proportional to the number of frames being processed, such as 3 frames all with different exposure times (e.g., long, short, shortest). For multi-exposure WDR sensors disclosed WDR image processing in contrast performs the image processing algorithms other than the statistics collection (e.g., DPC, LSC, NNF, WDR processing) after applying the WDR merge algorithm, thus being a post-merge data processing algorithm. The post-merge processing algorithms used are similar to conventional pre-processing algorithms with enhancements such as disclosed adaptive DPC and disclosed temporal multiplexed (muxed) H3A which each support the change in the order of signal processing implemented by disclosed early merge signal processing chains. The statistics for all frames are collected before the post-processing algorithm that in one example uses time division multiplexing (TDM) across the various frames.

Disclosed embodiments include a method of WDR multi-frame processing includes receiving raw image signals (e.g., of a scene) from a WDR sensor comprising a plurality of frames that each include a plurality of pixels, where the plurality of frames including a first frame having first exposure time pixel data (first pixel data) and at least a second frame having second exposure time pixel data (second pixel data), where the first and second pixel data each have an intensity value. Statistics are generated for camera control including first statistics for the pixel data and second statistics for the second pixel data. The first pixel data and second pixel data are merged using a WDR merge algorithm which utilizes the first statistics and second statistics to generate a raw higher bit width single frame image. Post-processing the single frame image is performed using at least a defect pixel correction algorithm (e.g., defect pixel correction, noise filtering, lens shading correction), and at least a portion of tone mapping is performed to the single frame image the post-processing to provide an output toned mapped image.

BRIEF DESCRIPTION OF THE DRAWINGS

Reference will now be made to the accompanying drawings, which are not necessarily drawn to scale, wherein.

DETAILED DESCRIPTION

Figure 1:
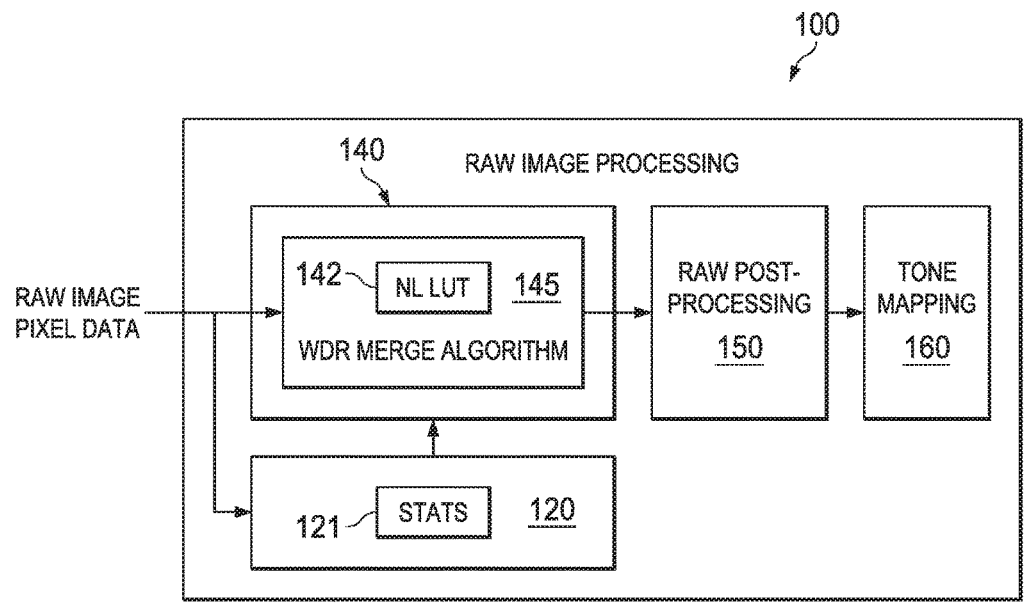
FIG. 1 is a block diagram representation of a simplified disclosed signal processing chain for WDR image processing that implements a disclosed early WDR merge that runs the processing algorithms post WDR merging, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a block diagram representation of a simplified disclosed signal processing chain 100 for WDR raw image processing that implements an early WDR merge compared to known signal chains for WDR image processing by running the processing algorithms such as DPC and LSC after WDR merging. Signal processing chain 100 supports on-the-fly (OTF) processing of raw image pixel data, such as received from a 2D WDR image sensor, (e.g., a WDR camera comprising raw image signals, such as in a Bayer pattern). The signal processing chain 100 is shown providing raw image pixel data to a statistics generation block 120 and to a WDR merge block 140 that implements a disclosed WDR merge algorithm 145. The statistics generation block 120 is marked as H3A 174 in FIG. 2, while the Mux 171, shift block 172 and the LUT inverse tone map block 173 in FIG. 2 enable time multiplexing and providing different data formats to the statistics generation block 120.

Figure 2:
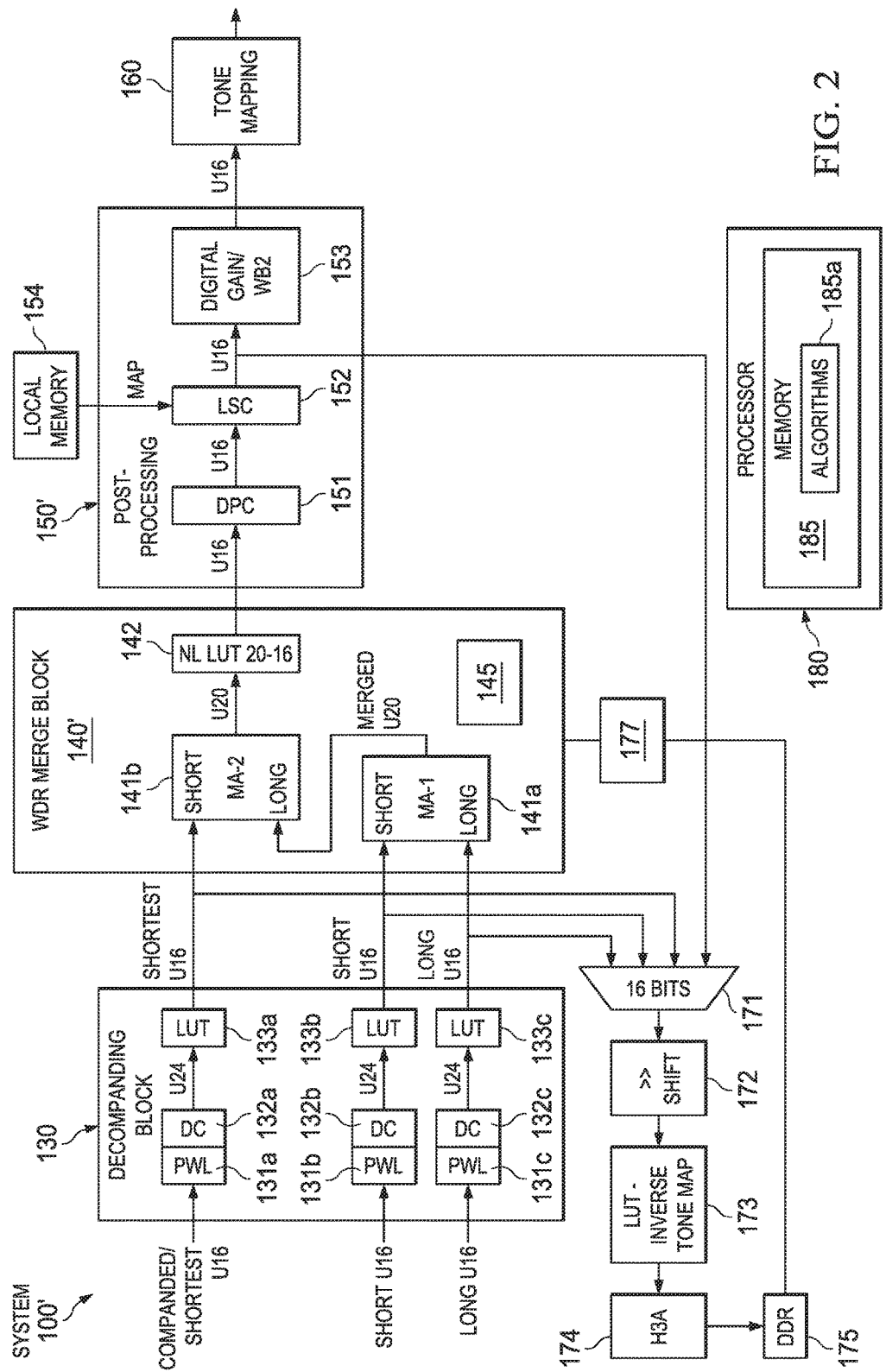
FIG. 2 is a block diagram representation of an example WDR image processing system for processing WDR sensor data that implements a disclosed early WDR merge, according to an example embodiment.

The raw image pixel data is in a plurality of frames having a plurality of different exposure times including a first exposure time and at least a second exposure time shown in FIG. 2 as a long, short, and shortest exposure time frame. Each frame as used herein refers to an image captured with a specific gain and a specific exposure time. The statistics generation block 120 is for generating statistics for camera control (e.g., auto exposure, auto white balance (WB) and autofocus) across the first frame and at least the second frame, optionally using time division multiplexing (TDM) which reduces the chip (e.g., silicon) cost overhead of multiple instances of the H3A block (see H3A block 174 in FIG. 2).

H3A is a hardware statistics engine for generating 3 sets of statistics, one each for auto WB correction, auto exposure, and auto focus. It can be seen that the merge operation provided by the WDR merge block 140 in signal processing chain 100 occurs significantly earlier as compared to known signal chains which raw pre-process pixel data using statistics (e.g., DPC, LSC, WB gain) and then performs a WDR merge operation. The H3A block 174 can collect statistics on either of the exposures or additionally on the data after tone map and post processing using the Mux 171, the FIG. 2 depicts this path (lowest line in the mux 171). This LUT inverse tone map block 173 can be used to invert the effects of tone map and thus generate statistics in linear domain which can provide better quality results.

The WDR merge block 140 performs merging using a WDR merge algorithm 145 implemented by a processor which utilizes the statistics 121 for each frame, such as to compute WB gains which can optionally be fedback into the merge block 140 to generate a raw higher pixel bit width (e.g., a 3 frame merge can increase the pixel bit width from 12 bits to 20 bits) single frame image. The merge algorithm 145 can optimally utilize a non-linear (NL) LUT 142 shown which provides significant area savings while still providing a boost in image quality. The NL LUT 142 provides better precision than a conventional LUT at a lower cost, and can enhance the merge algorithm 145 including removing artifacts due to application of WB gains. This LUT improvement provided by NL LUT 142 is achieved by using a much finer step in the lower intensity range of the image. The lower intensity range contains more useful information as well as the curve is steeper in this region and hence having a finer/lower step size helps. To reduce cost, the step size is increased (or kept higher) in the upper intensity range of the image. The difference in the step size in different ranges leads to the LUT being referred to herein as a NL LUT 142.

The NL LUT 142 in the merge block 140 helps improve the tone-mapping by providing an initial portion of the tone mapping which is referred to herein as global tone mapping. Tone mapping in signal processing chain 100 is generally split into two phases. There is a global tone mapping which is implemented by the NL LUT 142 which reduces the pixel bit width, such as from 20 bits down to 16 bits as shown in FIG. 2. Then there is a local tone mapping which follows provided by the tone mapping block 160 in the downstream logic described below. The NL LUT 142 helps in the first global tone mapping results as it reduces error in the graph.

Typically, the tone map is performed by programming an input to output graph, however there are only fixed number of entries in the graph. For example, a 20 bit pixel image would require $2^{20}$=1 million entries to have a fully populated graph (input to output). However, that is very high in semiconductor (e.g., silicon) cost, so disclosed embodiments implement the input to output graph with a step size (say 1 entry for every 2048 locations) and then perform linear interpolation for the locations in between. The standard LUT that is used in known art has a step size of 2048, however this is recognized to cause issues with the image quality since the input to output graph is changing much more rapidly in the lower section (low intensity portion) of the image as well as the fact that the lower section of the image has much more meaningful and important content. In the disclosed NL LUT 142 scheme a smaller step size is used in the lower intensity section of the image (e.g., step size of 32) and a higher step size (e.g. 2,048) is used in the higher intensity section of the image. This arrangement is recognized to provide almost the same benefit as putting the full LUT at the smaller (e.g., 32) step size, but at a small fraction of the size of the LUT and thus the cost of the implementation.

The post-processing block 150 performs post-merge processing of the raw high bit width pixel data in the single frame combined image output by WDR merge block 140 using a set of image filtering algorithms (e.g., DPC, noise filtering, and LSC). As noted above, the post-merge processing modifies known pre-processing algorithms, such as to utilize adaptive DPC and temporal muxed H3A which each support the early WDR merge implemented by signal chain 100. Temporal muxed H3A operates by temporal multiplexing across frames. Adaptive DPC handles tone mapped pixels using an adaptive thresholding algorithm. The tone mapping block 160 receives the processed single frame image from the post-processing block 150 by providing additional tone mapping to provide a tone mapped image that has reduced bit count. This additional tone mapping can be the second part of the tone mapping as described above where the tone mapping is split into 2 operations. This tone mapping splitting can typically reduce the bit width from 16 bits down to 12 bits, while still preserving details in the shadows and highlights.

Signal chain 100 is a low latency signal chain because it provides complete OTF processing, that is incoming frames of pixel data can be directly coupled to the signal processing chain 100 without any intermediate pass to external or local memory. Further, the design provided is architected to process up to 3 frames having different exposure times concurrently vs. known processing that has to pass the 3 frames sequentially (one after another) through the preprocessing block before the frames can be merged. The low latency and low delay is also enabled by having a configuration set of registers (or other memory) that are shadowed and can be updated anytime while the current frame is ongoing to program for the next frame vs. known designs that have to complete the current frame, change parameters and then process the next frame thereby incurring time delay to reprogram.

FIG. 2 is a block diagram representation of an example WDR image processing system 100' for processing WDR sensor data that runs the processing algorithms shown as DPC, LSC, and WB (that are in the post-processing block 150') after WDR merging provided by the WDR merge block 140'. There is a connection from DDR 175 to WDR merge block 140' to provide feedback. In a typical implementation this feedback involves a software algorithm implemented by a processing block 177 which uses H3A data from DDR 175 to calculate the WB gains needed in WDR merge block 140'. Additionally, there is typically a multiple frame delay before this is applied in order for the time multiplexing to operate. Thus the data from DDR 175 of frame N, may only be applied for example to frame N+3.

The WB can be treated in multiple instances including in the WDR merge block 140'. When the WDR merge block 140' is enabled, there is logic within this block which can correct for WB in each exposure. WB2 block 153 in the post-processing block 150 is used primarily when using a decompanded sensor when the WDR merge block 140' is generally disabled.

WDR image processing system 100' is shown comprising a processor 180 (e.g., central processing (CPU) comprising a microprocessor, digital signal processor (DSP), or a microcontroller unit (MCU)) having an associated memory 185 storing a plurality of algorithms 185*a*. The plurality of algorithms 185*a* implemented by the processor 180 includes a WDR merge algorithm shown as a block 145 referred to as a merge algorithm that is in WDR merge block 140' shown in FIG. 2, as well other algorithms including the image filtering processing algorithms shown as DPC 151, LSC 152, and digital gain/WB 153 in the post-processing block 150'.

Pixel data from three different frames having different exposures times is shown received from WDR sensors as a frame having a shortest exposure time (corresponding to the lowest brightness/intensity), frame having a short exposure time (corresponding to an intermediate brightness intensity), and a frame having a long exposure time (corresponding to the highest brightness intensity) all shown input to a decompanding block 130. The raw pixel data can come directly from the WDR sensor or from raw pixel data in a memory (e.g. DDR). Decompanding block 130 is only for processing pixel data received from companding WDR sensors which merge data on the sensor and compress it down, where PWL stands for Piece Wise Linear (PWL), a type of decompanding methodology. DC or commonly known as DC-sub subtracts a constant value from the intensity value of each pixel.

Decompanding block 130 includes a processing channel for each of the long, short and shortest exposure time frames including a PWL block 131*a-c*, a DC block 132*a-c* and a lookup table (LUT) 133*a-c*. PWL block 131*a-c* and DC block 132*a-c* are shown converting the 16 bit data received into 24 bits. The LUTs 133*a-c* convert the 24 bits back to 16 bits which is provided to the WDR merge block 140'. This double bit conversion is used when the sensor uses a compression function which makes the data unfeasible for processing.

The decompanding function provided by the decompanding block 130 shown in FIG. 2 is only used for companded sensors (as described above), and is not used or is bypassed when using sensors which provide separate exposures (multi-exposure sensors). For use with companded sensors the WDR merge block 140' is not used since companded sensors only provide one exposure of data. In the case of separate exposure sensors, the decompanding block 130 still provides its other DC function (DC 132*a*-132*c*) which is used even in the separate exposure sensor application. In this case, to provide only DC, one programs the PWLs (131*a*-131*c*) and LUTs 133*a*-133*c* as bypasses to not have any effect. Also, some special sensor devices compress data even when they are sending separate exposures, so there may still be use for either the PWLs (131*a*-131*c*) or LUTs 133*a*-133*c* in decompanding block 130.

The WDR merge block 140' implemented merge algorithm 145 that utilizes the NL LUT 142 shown provides significant area savings while still providing a boost in image quality. WDR merge block 140' provides single pass WDR merge at the line level by processing an incoming line of pixel data such that the output of any pixel is not dependent on other pixels in lines above or below the current line of pixels. The conventional reliance on pixel lines above or below the current line in other solutions is recognized to cause delay and increased latency in the signal chain implementation. WDR merge block 140 includes merge blocks 141*a* and 141*b*, where merge block 141*a* receives the pixel data from the short and long exposure time frames and is shown outputting a 20 bit merged pixel data output that is input to merge block 141*b* which also receives the pixel data from the shortest exposure time frame. The NL LUT 142 has a finer step size at lower intensities compared to a step size at higher intensities. WDR merge block 140' implements high quality WDR image processing using a relatively sophisticated weight calculation for merging frames with different exposure times which accounts for WB.

The WB algorithm incorporates two separates paths for generating weights by generating the final merged pixel value after the initial gain and processing steps are performed. The weight generation logic relies on pixel data which have not been corrected for WB. The reason for this is that the WB correction can cause artifacts when the pixel value are near the decision threshold(s) where the merge curve changes. By keeping the WB gains only on the path leading to the final pixel output one obtains the advantage of getting color corrected data but not the artifacts that appear when pixel values are close to the merge threshold(s).

Figure 3:
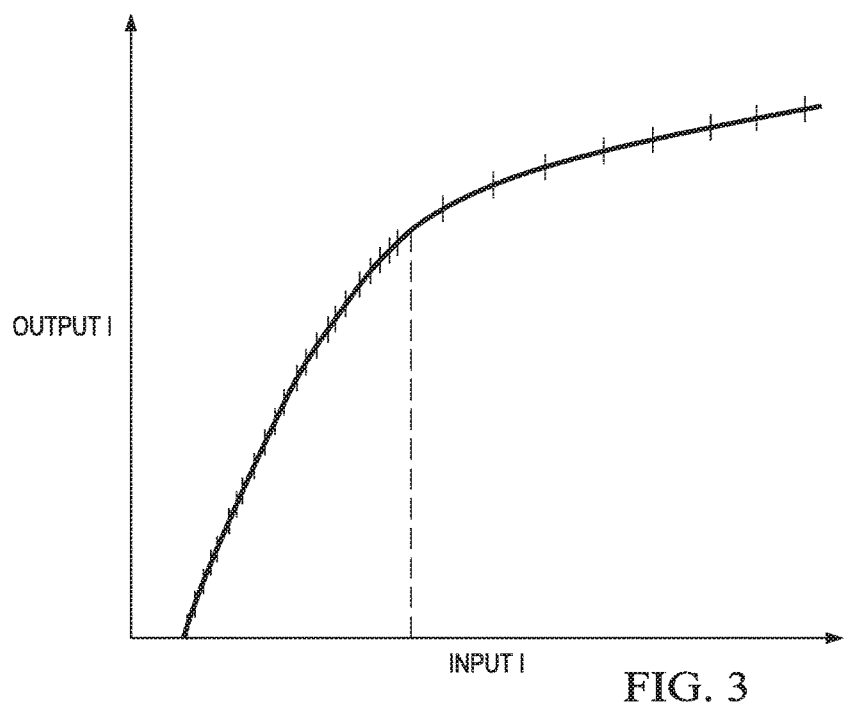
FIG. 3 depicts a tone mapping curve plotting the output intensity vs. input intensity that has a finer step size (corresponding to closer spaced data) in the NL LUT shown at lower intensities compared to a step size (corresponding to closer spaced data in the NL LUT) at higher intensities.

FIG. 3 depicts a tone mapping curve plotting the output intensity vs. input intensity that has a finer step size (corresponding to closer spaced data in the LUT 142) shown at lower intensities compared to a step size (corresponding to closer spaced data in the NL LUT 142) at higher intensities. For example, the step size at higher intensity can be 2048, whereas at the lower intensities the step size can be 32.

The post-processing block 150' performs post-merge processing using a set of image filtering processing algorithms shown as DPC 151, LSC 152, and digital gain/WB 153. As described below DPC 151 can be adaptive DPC. Local memory 154 provides a sub-sampled gain table which is used by the LSC 152 for lens shading correction. These tables are initialized once during bootup. Besides storing these tables in the local memory 154, they can be stored in another memory such as in the DDR 175. The output from LSC 152 and outputs from the decompanding block 130 are also shown coupled to a series combination of a (Mux 171, shift block 172, inverse tone map LUT 173, H3A block 174 and a memory for storing the output from the H3A block 174 shown as DDR 175. The result of H3A stored in DDR 175 is used by the host processor to compute the WB gains used in the WDR merge block. The result is also generally used for controlling exposure of the sensors, etc.

The output from the post-processing block 150' is shown coupled to an input of a tone mapping block 160 which as described above can provide local tone mapping as a second tone mapping operation after the global tone mapping provided by NL LUT 142 for multi exposure sensors or in the LUTs 133a-133c for use with companded sensors. The global tone mapping applies the same curve (gain) to each pixel that have the same intensity. The local tone mapping process 160 adaptively modifies the gain depending on the intensity of the neighboring pixels as well. Tone mapping block 160 reduces the dynamic range (or contrast ratio) of the full color image while retaining localized contrast to provide a tone mapped image.

Tone mapping provided by NL LUT 142 or by LUTs 133a-133c in the decompanding block 130 can implement high speed switching of tone mapping curves based on illumination level for varying illumination levels. This can be achieved by using a ping-pong scheme for the respective LUT memories such that software can update the contents of one LUT while another LUT is in use.

Figure 4A:
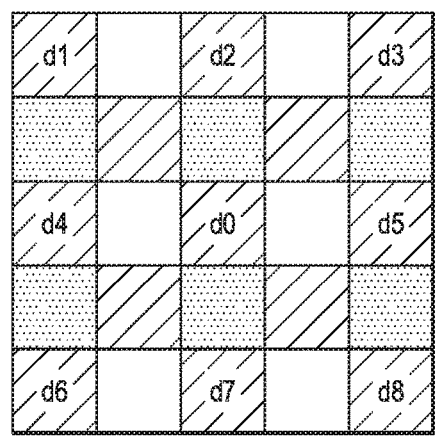
FIG. 4A and FIG. 4B describe by an example the workings of a disclosed adaptive DPC algorithm that utilizes intensity adaptive thresholds to support WDR and tone mapped pixel data.
Figure 4B:
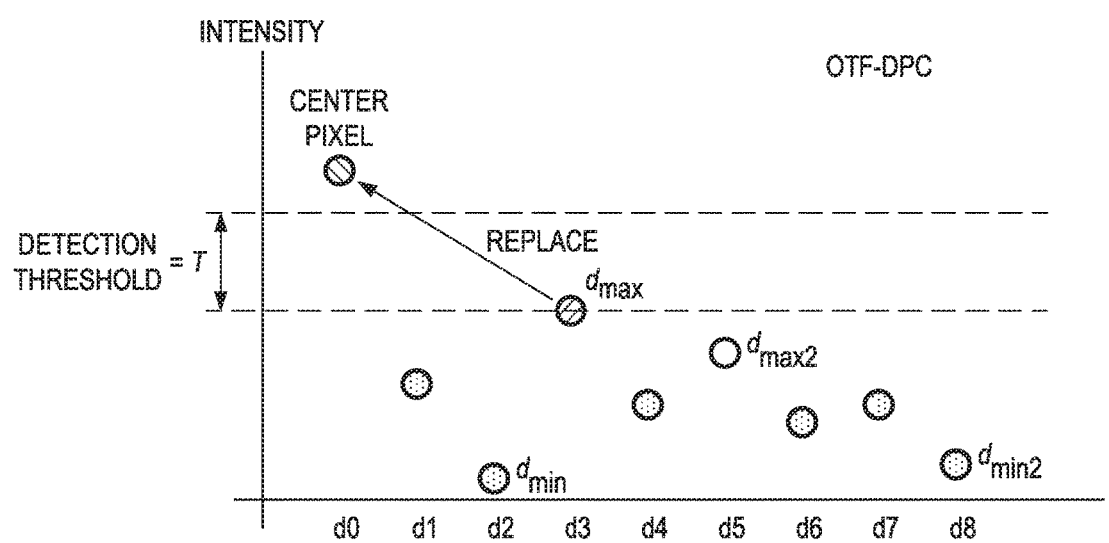

FIG. 4A and FIG. 4B describe by an example the workings of a disclosed adaptive (OTF) DPC algorithm that utilizes intensity adaptive thresholds to help support WDR and tone mapped pixel data. The local intensity (in a 3×3 pixel window) is approximated efficiently obtained by using the average of the 2nd largest (shown as $d_{max2}$) and 2nd smallest pixel value (shown as $d_{min2}$) from pixels d1~d8. Another LUT (not shown in FIG. 2) is a small LUT generally implemented as independent registers can store values for pixel intensity corresponding to 0, 512, 1 k, 2 k, 4 k, 8 k, 16 k, and 32 k. Linear interpolation can then be used for generating intermediate threshold intensity values.

Regarding the detection threshold and the replacing process, once the local intensity is computed, the threshold is generated by selecting from the 8 different threshold values (as stored in the small LUT) or by linear interpolation of two values from the table if the intensity lies in between the specified intensity stops. The center pixel is then compared against the dmax/dmin pixel value, and if difference of the intensity of the center pixel and the dmax/dmin pixel is greater than the threshold, the pixel is considered a defect and replaced by either one of the neighbors or by an average of the neighbors. The replacement scheme is software programmable. Comparisons of dman/dmin are provided since the defect can arise due to either the center pixel being a bright defect or a dark defect in which case its value is much lower than it should be.

Disclosed embodiments can be used for a variety of different WDR imaging-related applications. Example applications include, but are not limited to, automotive, ADAS, industrial, high performance computing, robotics, and drones.

EXAMPLES

Disclosed embodiments are further illustrated by the following specific Examples, which should not be construed as limiting the scope or content of this Disclosure in any way.

Regarding disclosed NL LUTs, such as NL LUT 142 shown in FIGS. 1 and 2, a conventional LUT with 512 entries in a 20 bit pixel image causes a step size of 2 k which creates a color shift and artifacts in the visually sensitive lower intensity range of the image. An acceptable step size is 32 vs 2 k (in conventional art). Simply maintaining an example constant step size of 32 causes a 64× increase in the memory size and the area of the LUT. A disclosed NL LUT 142 in contrast maintains higher precision (step size=32) in the lower intensity critical range and can use a standard step size of 2 k in the higher (less sensitive) intensity range. This enables achieving desired image quality goals, such as with only 20% increase in area vs. a 64× increase in area required in conventional design.

Regarding disclosed merge algorithms, WB gains are typically applied by the WDR merge block 140' on independent exposure(s) in the linear domain. WB gain application can cause artifacts in weight generation in conventional art. Disclosed merge algorithms are designed with separate data paths for pixel processing and weight calculation logic that avoids artifacts due to variation in weights across color channels. Regarding disclosed multi-frame merging, the merge algorithm 145 can be enhanced to support merging of 2 frames up to 16 bits each with support for varying bit widths below 16. Multiple instances of the WDR merge block 140 can be used to support up to 3 frame merge OTF, >3 frames in multi-pass mode, and support asymmetric WDR sensors (e.g. sensors with a 12 bit and 16 bit exposure).

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:
1. A method of wide dynamic range (WDR) multi-frame processing, comprising:
receiving raw image signals from a WDR sensor comprising a plurality of frames that each include a plurality of pixels, said plurality of frames including a first frame having first exposure time pixel data (first pixel data) and at least a second frame having second exposure time pixel data (second pixel data), said first and said second pixel data having an intensity value;

generating statistics for camera control including first statistics for said first pixel data and second statistics for said second pixel data;

merging said first pixel data and said second pixel data using a WDR merge algorithm which utilizes said first statistics and said second statistics to generate a raw higher bit width single frame image;

post-processing said raw higher bit width single frame image using at least a defect pixel correction algorithm, and performing at least a portion of tone mapping to said raw higher bit width single frame image after said post-processing to provide an output toned mapped image.

2. The method of claim 1, wherein said first statistics and said second statistics are generated using time division multiplexing (TDM) across said first pixel data in said first frame and said second pixel data in said second frame.

3. The method of claim 1, further comprising before said post-processing performing an initial global tone mapping using a non-linear (NL) look-up table (LUT) that has a finer step size at lower pixel intensities compared to a step size at higher pixel intensities to reduce a pixel bit width from a pixel bit width in said raw higher bit width single frame image.

4. The method of claim 1, wherein said post-processing further comprises adaptive defective pixel correction (DPC), lens shading correction (LSC), and temporal multiplexing.

5. The method of claim 1, wherein said plurality of frames further comprises a third frame having third exposure time pixel data (third pixel data), wherein said generating said statistics for camera control further includes generating third statistics for said third pixel data, and wherein said merging merges said first pixel data, said second pixel data and said third pixel data.

6. The method of claim 1, wherein said merging increases a bit width by at least 25%.

7. The method of claim 1, further comprising using said statistics to compute white balance (WB) which is fedback to a WDR merge block performing said merging.

8. The method of claim 3, wherein said NL LUT comprises a plurality of NL LUTs having different tone mapping curves covering different levels of said intensities further comprising switching between respective ones of said plurality of NL LUTs, and wherein software updates a content of one of said NL LUTs while another of said plurality of NL LUTs is in use.

9. A signal processing chain for wide dynamic range (WDR) multi-frame processing, comprising:

a statistics generation block;

a WDR merge block having a WDR merge algorithm, both said statistics generation block and said WDR merge block are coupled for receiving raw image signals from a WDR sensor comprising a plurality of frames that each include a plurality of pixels, said plurality of frames including a first frame having first exposure time pixel data (first pixel data) and at least a second frame having second exposure time pixel data (second pixel data), said first and said second pixel data having an intensity value;

said statistics generation block for generating statistics for camera control including first statistics for said first pixel data and second statistics for said second pixel data;

said WDR merge block for merging said first pixel data and said second pixel data using said WDR merge algorithm which utilizes said first statistics and said second statistics to generate a raw higher bit width single frame image;

a post-processing block for post-processing said raw higher bit width single frame image using at least a defect pixel correction algorithm, and a tone mapping block for performing at least a portion of tone mapping performed by said signal processing chain to provide an output tone mapped image.

10. The signal processing chain of claim 9, wherein said first statistics and said second statistics are generated by said statistics generation block using time division multiplexing (TDM) across said first pixel data in said first frame and said second pixel data in said second frame.

11. The signal processing chain of claim 9, further comprising a non-linear (NL) look-up table (LUT) that has a finer step size at lower pixel intensities compared to a step size at higher pixel intensities to reduce a pixel bit width from a pixel bit width in said raw higher bit width single frame image.

12. The signal processing chain of claim 9, wherein said post-processing further comprises adaptive defective pixel correction (DPC), lens shading correction (LSC), and temporal multiplexing.

13. The signal processing chain of claim 9, wherein said plurality of frames further comprises a third frame having third exposure time pixel data (third pixel data), wherein said generating said statistics for camera control further includes generating third statistics for said third pixel data, and wherein said merging merges said first pixel data, said second pixel data and said third pixel data.

14. The signal processing chain of claim 9, wherein said merging increases a bit width by at least 25%.

15. The signal processing chain of claim 9, further comprising a processing block that uses said statistics to compute white balance (WB) which is fedback to said WDR merge block.

16. The signal processing chain of claim 11, wherein said NL LUT comprises a plurality of NL LUTs having different levels of said intensities further comprising switching between respective ones of said plurality of NL LUTs, and wherein software updates a content of one of said NL LUTs while another of said plurality of NL LUTs is in use.

* * * * *